Patented Sept. 21, 1937

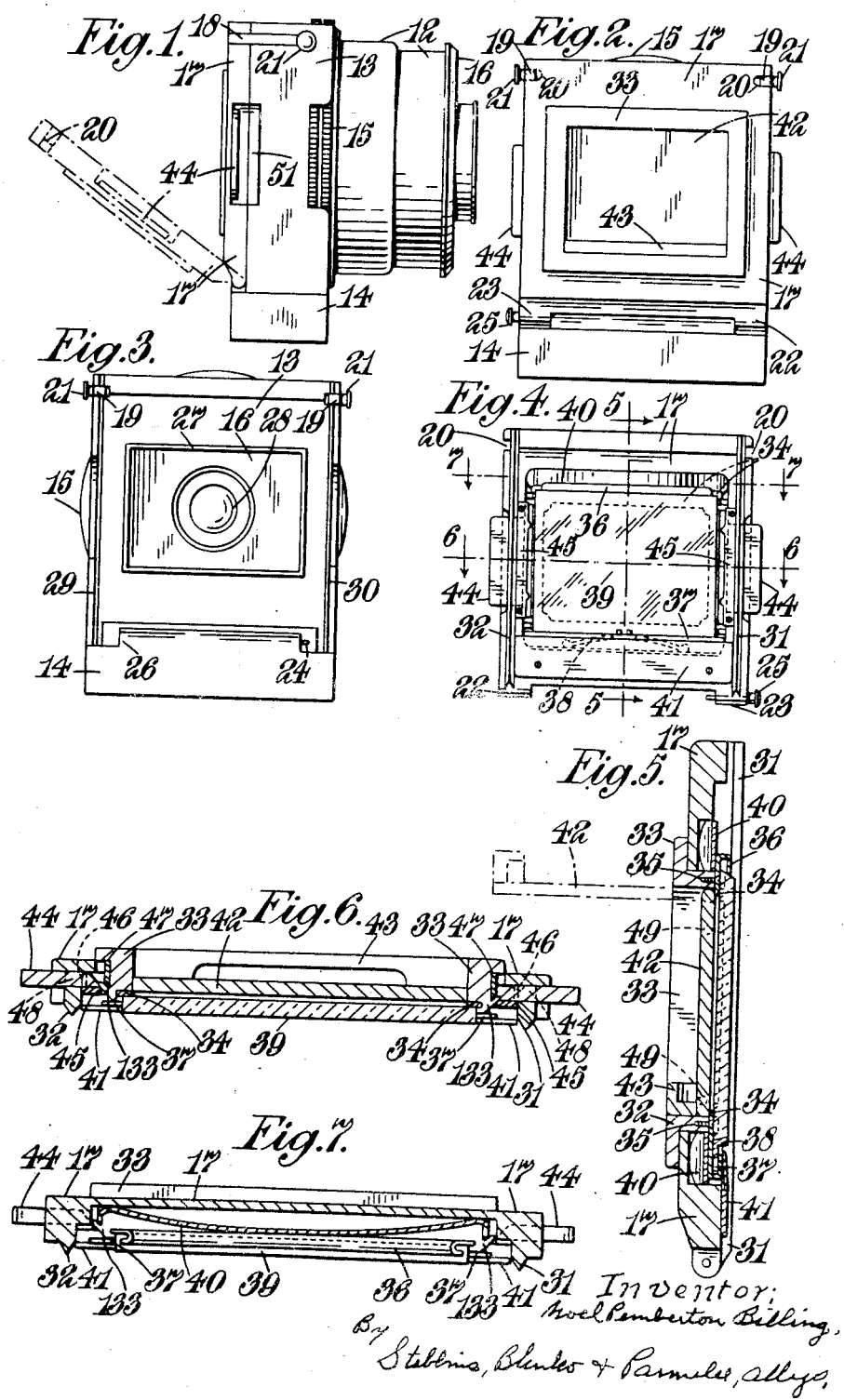
Sept. 21, 1937.   N. P. BILLING   2,093,399
FILM CARRIER FOR PHOTOGRAPHIC CAMERAS
Filed July 23, 1936

2,093,399

UNITED STATES PATENT OFFICE 2,093,399

FILM CARRIER FOR PHOTOGRAPHIC CAMERAS

Noel Pemberton Billing, London, England

Application July 23, 1936, Serial No. 92,195
In Great Britain August 8, 1935

11 Claims. (Cl. 95—66)

The present invention consists in improvements in or relating to supports for photographic sensitized material for use in photographic cameras and has for its object the provision of such a support constructed to insure that photographic film or plates exposed within the camera are correctly and firmly held in the focal plane thereof. The invention is primarily applicable to film supports intended for use with photographic plates, or photographic film provided in separate flat pieces, enclosed in a paper or like envelope.

The present invention provides for use with a photographic camera having an aperture through which photographic sensitized material is to be exposed, the combination of a support for the said material constituting a closure for the aperture, a presser member mounted in said support to engage behind the material and press the latter around the margins of the aperture, and manually operable cooperating cams at the edges of the presser member and adjacent parts of the support to enable the presser member to be moved into positions at which it engages behind and releases pressure on the photographic sensitized material respectively.

The combination provided by the invention preferably comprises resilient means normally tending to urge the presser member against the film, and manually operable cams such as to enable the presser member to be moved against the action of the resilient means to release the pressure of the said member from the surface of the sensitized material.

In order that the invention may be more clearly understood a preferred constructional example will be described with reference to the accompanying drawing in which:—

Figure 1 is a side view of a photographic camera provided with a support for photographic film or plates contained in a flat envelope or packet;

Figure 2 is a rear elevation of the camera and support shown in Figure 1;

Figure 3 is a rear elevation similar to Figure 2 of the photographic camera with the support removed;

Figure 4 is a front elevation of the support removed from the camera shown in Figures 1 to 3;

Figure 5 is a section on the line 5—5 of Figure 4 looking in the direction of the arrows and drawn to a larger scale;

Figure 6 is a section on the line 6—6 of Figure 4 looking in the direction of the arrows and drawn to the scale of Figure 5; and Figure 7 is a section on the line 7—7 of Figure 4 looking in the direction of the arrows and drawn to the scale of Figures 5 and 6.

Like reference numerals indicate like parts throughout the drawing.

The support for sensitized material shown in the drawing is formed as a detachable back for a camera body of a construction now to be described. This camera body has telescopic elements 12 collapsible within a portion 13 having the shape of a rectangular box and having secured to it a part 14 to accommodate auxiliary instruments for use with the camera such as view-finders and the range-finder. The camera body is also provided with a focussing ring 15 to move bodily the telescopic portions 12 and a camera front 16 carrying the camera lens and secured to the foremost telescopic portion of the camera body. A very compact form of photographic camera is obtained with this construction of the camera body and since a lens of relatively short focal length is employed in such a camera, it is of great importance that the support for the sensitized material (referred to hereinafter for the sake of brevity as a "film carrier") should be such as to hold the said material firmly and correctly in the focal plane of the camera. It will be understood, however, that the invention is not limited to a film carrier for use with a photographic camera of small dimensions having a lens of relatively short focal length since the advantages obtained by the use of a film carrier constructed in accordance with the invention with such a camera are also obtained with any other camera construction.

A main frame 17 of the film carrier is hinged at its lower part to the camera body to enable the film carrier to be moved to the position shown in chain lines in Figure 1 in order that the camera may be loaded with photographic material. In the closed position a pair of lever arms 18 pivotally mounted in the camera body 13 and having hooked ends 19 serve to secure the film carrier in place, suitable recesses 20 being provided in the main frame 17 of the film carrier to accommodate the hooked end portions of the lever arms 18. The latter are released by pressure on the abutments 21 provided at that end of the lever arms remote from the hooked ends and leaf springs located between the lever arms 18 and the body portion 13 serve to maintain the arms 18 normally in the position at which the film carrier is secured to and applied to the camera body 13. The hooked ends of the lever arms 18 and the recesses 20 in the frame 17 of the film carrier are suitably shaped with cam surfaces to render the lever arms 18 self-locking as the film carrier is moved from the position shown in chain lines in Figure 1 to the closed position shown in full lines.

The lower part 14 of the camera body, as seen more clearly from Figure 3, is provided with cutaway portions at its corners to accommodate depending portions 22 and 23 of the main frame 17 of the film carrier. The part 22 has a small bore to accommodate a pin 24 provided on the camera body and shown in Figure 3. The part 23 accommodates a spring-pressed plunger 25 which when the part 23 is in a suitable position can be released to enter an accommodating bore in the upstanding portion 26 of the part 14 indicated in Figure 3. The plunger 25 and the pin 24 serve as hinge pins about which the film carrier may be turned. When in the closed position the film carrier serves to press the photographic film against the raised edges 27 of an aperture in the part 13 of the camera body through which light entering the camera lens 28 is allowed to act upon the film.

The camera body 13 is provided at its side edges with a pair of V-shaped ridges 29 and 30, the inner sloping surfaces of which ridges are engaged by the external surfaces of V-shaped ridges 31 and 32 provided at the side edges of the forward or internal surface of the main frame 17 of the film carrier. Co-operation between the ridges 29 and 31 and 30 and 32 respectively ensures a light-tight closure between the film carrier and the camera body along the side edges. The ridges 31 and 32 also serve as guides for the film envelope in which the pieces of film to be exposed are contained. The forward surface of the frame 17 along its upper edge is cut back somewhat as seen in Figure 5 so that a small gap exists between the camera body 13 and the frame 17 when the camera back is in the closed position and a slide or equivalent member of the envelope carrying the film is withdrawn through this gap to expose the film within the camera.

The main frame 17 of the film carrier is provided with a central aperture into which is inserted a rectangular frame 33 having a flange at its rearward edge as seen in elevation in Figure 2 and in section in Figures 5 and 6. At the forward edge of the frame 33 there is secured a small metal frame 34 seen in section in Figures 5 and 6 and shown in dotted lines in Figure 4. The frame 34 is secured to the frame 33 by means of screws 35 (see in Figure 5) and is provided at its upper and lower edges with folded over portions 36 and 37. The lower folded over portion 37 is relatively deep and serves to accommodate a bowed or leaf spring 38 seen in dotted lines in Figure 4 and shown in section in Figure 5. The spring 38 presses against one edge of a translucent glass screen 39 having chamfered edges and retained between the upper folded over edge 36 of the frame 34 and the spring 38. It is merely necessary to flatten the spring 38 somewhat in order to remove the glass screen 39 from the position shown in the drawing. Between the upper and lower edge portions of the frame 34 and the main frame 17 are located a pair of flat leaf springs 40 serving to maintain the frame 33, the frame 34 and the screen 39 in a forward position relatively to the main frame 17, this forward position being limited by engagement of the rearward flange of the frame 33 with the edges of the aperture in the main frame 17. The ground glass screen 39 serves as a presser plate to hold the film pressed against the ridge 27 at the edges of the aperture in the camera body which defines the area of film to be exposed in the camera. It is by this means that exact registration of the film in the correct focal plane is made possible, it being understood that the plate 39 presses on the rear of the film and is in actual contact with the film envelope in which the film is normally carried.

The ground glass screen 39 also serves as a focussing screen since it is visible through the aperture in the main frame 17. A closure plate 42, however, is pivotally mounted in the frame 33 and is capable of movement to the position shown in chain lines in Figure 5 to expose the screen 39 or to the position shown in full lines in which it serves as a protective cover for the screen. The closure plate 42 is provided with a lower lip 43 to enable suitable manipulation of the plate to be made. Pairs of spring-click devices 49 are provided in the frame 33 for the purpose of locating the closure plate 42 in one or other of its positions of adjustment. The forward face of the film carrier is also provided with a guard strip 41 secured to the main frame 17 and serving to enclose the lower part of the frame 34 and the spring 38 accommodated therein.

At the sides of the frame 33 passing through the aperture in the main frame 17 a pair of cam surfaces 133 is provided to co-operate with a pair of cams 44 mounted in slots in the sides of the main frame 17. The cams 44 can move inwardly under pressure from the finger and thumb of a manipulator and by co-operation with the cam surfaces 133 serve to press the frame 33, frame 34 and glass screen 39 carried thereby in a rearward direction relatively to the main frame 17 of the film carrier. That is to say, by inward movement of the cams 44 the presser element is moved against the springs 40 and the film within the camera is relieved of pressure normally holding it firmly against the ridge 27 of the exposure aperture in the camera. Manipulation of the film or film envelope within the carrier is preferably carried out when the presser element is thus held in its retracted position. The cams 44 are provided with slots 48, shown in chain lines in Figure 6, through which pass pins 46, also shown in chain lines in Figure 6, and forming part of the main frame 17. Two small cover plates 45, shown in Figure 6 and again in front view in Figure 4, serve to enclose the cams 44 so that they are securely carried by the pins 46. The slots 48 enable the inward movement of the cams 44 already described to take place.

In the construction shown in the drawing, the frame 33 is also provided at its lateral sides with small spring parts 47 to ensure a correct centering of the assembly forming the movable presser member. These parts 47 are shown in Figure 6. Portions of the film carrier and of the camera body 13 are cut away adjacent to the cams 44 to enable a satisfactory operation of the latter to be effected. These cut-away portions are shown clearly at 51 in Figure 1.

It will be appreciated that considerable modification in the mechanical details of construction may be effected in the example of the invention above described.

I claim:

1. For use with a photographic camera having an aperture through which photographic sensitized material is to be exposed, the combination of a support for the said material constituting a closure for the aperture, a presser member movably mounted in the support to engage behind the sensitized material and to press the latter around the margins of the aperture, resilient means normally tending to urge the presser member against the sensitized material, a cam surface carried by the presser member, and a cam element movably mounted in the support to cooperate with the cam surface and afford manually operable means whereby the presser member can be moved against the action of the resilient means to release the pressure of the said member from the surface of the film.

2. For use with a photographic camera having an aperture through which photographic sensitized material is to be exposed, the combination according to claim 1 comprising a pair of cam elements respectively mounted at the sides of the support to move in slots provided in the latter, and a frame element which carries the presser member and is movably mounted in a central aperture in the support and which is formed at each side with a cam surface to co-operate with one of the cam elements.

3. For use with a photographic camera having an aperture through which photographic sensitized material is to be exposed, the combination according to claim 1 comprising a pair of cam elements respectively mounted at the sides of the support to move in slots provided in the latter, a frame element which is movably mounted in a central aperture in the support and which is formed at each side with a cam surface to co-operate with one of the cam elements, and a flat translucent screen carried by the frame element to close a central aperture in the latter and to constitute the pressure member.

4. For use with a photographic camera having an aperture through which photographic sensitized material is to be exposed, the combination according to claim 1 comprising a pair of cam elements respectively mounted at the sides of the support to move in slots provided in the latter, a frame element which is normally mounted in a central aperture in the support and which is formed at each side with a cam surface to co-operate with one of the cam elements, a flat translucent screen carried by the frame element to close a central aperture in the latter and to constitute the presser member, and a hinged cover for the rear surface of the screen also carried by the frame element to close the central aperture thereof.

5. For use with a photographic camera having an aperture through which photographic sensitized material is to be exposed, the combination according to claim 1 comprising a pair of cam elements respectively mounted at the sides of the support to move in slots provided in the latter, a frame element which is movably mounted in a central aperture in the support and which is formed at each side with a cam surface to co-operate with one of the cam elements, an auxiliary frame secured to the frame element and having upstanding and turned over flanges at two opposed edges, a flat plate constituting the presser member and having one edge in contact with one of the aforesaid flanges, and a bowed spring to secure the presser member in position located between the other edge of the plate and the other flange of the auxiliary frame.

6. For use with a photographic camera having an aperture through which photographic sensitized material is to be exposed, the combination according to claim 1 comprising a pair of cam elements respectively mounted at the sides of the support to move in slots provided in the latter, a frame element which is movably mounted in a central aperture in the support and which is formed at each side with a cam surface to co-operate with one of the cam elements, an auxiliary frame secured to the frame element and having upstanding and turned over flanges at two opposed edges, a flat plate constituting the pressure member and having one edge in contact with one of the aforesaid flanges, a bowed spring to secure the presser member in position located between the other edge of the plate and the other flange of the auxiliary frame, and a pair of single leaf springs located on opposite sides of the presser member between the support and the auxiliary frame to constitute the resilient means to urge the presser member against the film.

7. For use with a photographic camera having an aperture through which a photographic film is to be exposed, the combination of a film carrier which constitutes a closure for the aperture and which is formed to accommodate roll film and to have an orifice for exposing a film number, a displaceable cover associated with said orifice, a presser member mounted in the carrier to engage behind that part of the roll film to be exposed in the camera and to press the film around the margins of the aforesaid aperture, means to urge the presser member against the film, withdrawing means for the presser member to enable the latter to be moved to release the pressure of the said member from the surface of the film, a rearward extension on the presser member formed with a cam surface, a manually operable cam element slidably mounted on the rear of the carrier to co-operate with the aforesaid cam surface and constitute the withdrawing means for the presser member, an extension formed on the cam element to constitute the displaceable cover, and an operative connection between said withdrawing means and the displaceable cover whereby the latter and the presser member are movable only in company.

8. For use with a photographic camera having an aperture through which a photographic film is to be exposed, the combination of a film carrier which constitutes a closure for the aperture and which is formed to accommodate roll film and to have an orifice for exposing a film number, a displaceable cover associated with said orifice, a presser member mounted in the carrier to engage behind that part of the roll film to be exposed in the camera and to press the film around the margins of the aforesaid aperture, means to urge the presser member against the film, withdrawing means for the presser member to enable the latter to be moved to release the pressure of the said member from the surface of the film, a rearwardly extending tubular boss on the presser member which is formed with a flange at its outer end shaped to afford a cam surface and which passes through and surrounds the central area of the orifice associated with the displaceable cover, a manually operable cam element slidably mounted on the rear of the carrier to co-operate with the aforesaid cam surface and constitute the withdrawing means for the presser member, an extension formed on the cam element to constitute the displaceable cover, and an operative connection between said withdrawing means and the displaceable cover whereby the latter and the presser member are movable only in company.

9. For use with a photographic camera having an aperture through which a photographic film is to be exposed, the combination of a film carrier which constitutes a closure for the aperture and which is formed to accommodate roll film and to have an orifice for exposing a film number, a presser member mounted in the carrier to engage behind that part of the roll film to be exposed in the camera and to press the film around the margins of the aforesaid aperture, a screwthread device to move the presser member towards and away from the film, a rotatably mounted cover for the orifice through which the film number can be observed, and a geared connection between the rotatably mounted cover and a rotatable element of the screwthread device.

10. For use with a photographic camera having an aperture through which photographic sensitized material is to be exposed, the combination of a support for the said material constituting a closure for the aperture, a presser member mounted in said support to engage behind the material and press the latter around the margins of the aperture, and manually operable cooperating cams at the edges of the presser member and adjacent parts of the support to enable the presser member to be moved into positions at which it engages behind and releases pressure on the photographic sensitized material respectively.

11. For use with a photographic camera having an aperture through which photographic sensitized material is to be exposed, the combination of a support for the said material constituting a closure for the aperture, a presser member mounted in said support to engage behind the material and press the latter around the margins of the aperture, resilient means normally tending to urge the presser member against the sensitized material, and manually operable cams at the edges of the presser member and adjacent parts of the support to enable the presser member to be moved against the action of the resilient means to release the pressure of said member against the sensitized material.

N. P. BILLING.

DISCLAIMER 2,093,399.—*Noel Pemberton Billing*, London, England. FILM CARRIER FOR PHOTOGRAPHIC CAMERAS. Patent dated September 21, 1937. Disclaimer filed January 8, 1938, by the patentee.
Hereby disclaims from the patent claims 7, 8, and 9.
[*Official Gazette February 1, 1938.*]